United States Patent [19]

Gregson et al.

[11] Patent Number: 5,982,452
[45] Date of Patent: Nov. 9, 1999

[54] ANALOG VIDEO MERGING SYSTEM FOR MERGING N VIDEO SIGNALS FROM N VIDEO CAMERAS

[75] Inventors: Peter H. Gregson, Halifax; Steve M. Franklin, Dartmouth, both of Canada

[73] Assignee: Dalhousie University, Halifax, Canada

[21] Appl. No.: 09/046,701

[22] Filed: Mar. 24, 1998

Related U.S. Application Data

[60] Provisional application No. 60/041,624, Mar. 27, 1997.

[51] Int. Cl.[6] ....................................................... H04N 9/74
[52] U.S. Cl. ............................................ 348/584; 348/598
[58] Field of Search ..................................... 348/584, 598, 348/588, 239; H04N 5/262, 9/74

[56] References Cited

U.S. PATENT DOCUMENTS

| | | |
|---|---|---|
| 3,778,542 | 12/1973 | Hanseman . |
| 3,991,266 | 11/1976 | Baer . |
| 4,300,161 | 11/1981 | Haskell . |
| 4,467,356 | 8/1984 | McCoy . |
| 4,621,280 | 11/1986 | Shinohara et al. . |
| 5,448,307 | 9/1995 | Gelissen et al. . |
| 5,532,714 | 7/1996 | Knapp et al. . |
| 5,566,251 | 10/1996 | Hanna et al. . |
| 5,583,536 | 12/1996 | Cahill . |

OTHER PUBLICATIONS

Steve Franklin, "A Real–Time Interactive Motion Tracking System", Thesis Technical University of Nova Scotia, pp. 1–82 1997.

(List continued on next page.)

*Primary Examiner*—Sherrie Hsia

[57] ABSTRACT

This invention relates to an analog video merging system, and more particularly to a system that can take the output of a plurality of video cameras and form a combined video signal which can be fed to a computer having only a single frame grabber card. This system is used to track targets using multiple video cameras. The present invention is comprised of an analog video merging apparatus for merging N video signals from N video cameras. The apparatus is comprised of N video processors, each of the N processors is connected to the N video cameras in a one-to-one correspondence, wherein each of the N video processors compares the video signal associated with one of the N video cameras with a dynamic predetermined threshold level and produces a binary output signal having a low level and a high level, the low level being output if the associated video signal is below the predetermined threshold, and high level being output if the associated video signal is above the predetermined threshold. N binary combiners are provided, with each being connected to the N video processors in a one-to-one correspondence. Each combiner produces a processed binary signal having a low level and a high level, the low level being output in the presence of a low level output from the associated video processor and a high level being output in the presence of a high level from the associated video processor, wherein the high level of the processed binary signal is a unique level to that particular binary combiner such that a unique high level is output from the N binary combiners that are associated with the N video cameras. The processed binary signal for camera N is scaled by a factor of $2^{N-1}$ with respect to the other camera signals. A summing unit is provided for summing N processed binary signals from the N binary combiners to produce a merged video signal. A method of providing a merged video signal is also provided.

19 Claims, 6 Drawing Sheets

OTHER PUBLICATIONS

S. Seelmann and G. McClean, "Sub-Pixel Detection of Active Targets" in IEEE Pacific Rim Conference on Communications, Computers and Signal Processing, pp. 470–473, IEEE, May 1993.

R. Talluri and W. Choate, "Target Tracking and Range Estimation Using an Image Sequence" in IEEE Workshop on Application of Computer Vision, Proceedings, pp. 84–91, IEEE Comput. Soc. Press, Nov. 1992.

D. Murray and A. Basu, "Motion Tracking With an Active Camera", IEEE Trans. Pattern Anal. Mach. Intell., vol. 16, No. 5, pp. 449–459, May 1994.

D. Gavrila and L. Davis, "3–D Model–Based Tracking of Humans in Action: A Mulitview Approach" in IEEE Conf. On Computer Vision and Pattern Recognition, IEEE Comput. Soc. Press, Jun. 1996.

H. Kaufman and M. Sid–Ahmed, "Hardware Design of 2–D Analog Filters for Directly Filtering Raster Scanned Images in Real Time" in 1990 IEEE International Symposium on Circuits and Systems, pp. 3023–3026, IEEE, May 1990.

M. Liggins and A. Bramson, "Off–Board Augmented Fusion for Improved Target Detection and Tracking" in Conference Record of the Twenty–Seventh Asilomar Conference on Signals, Systems and Computers 1993, vol. 1.1, pp. 295–299, IEEE Comput. Soc. Press, Nov. 1993.

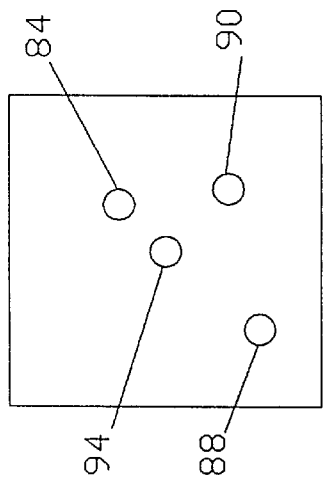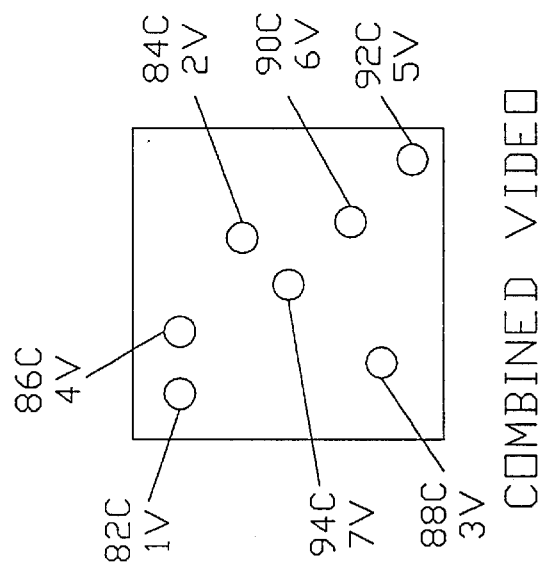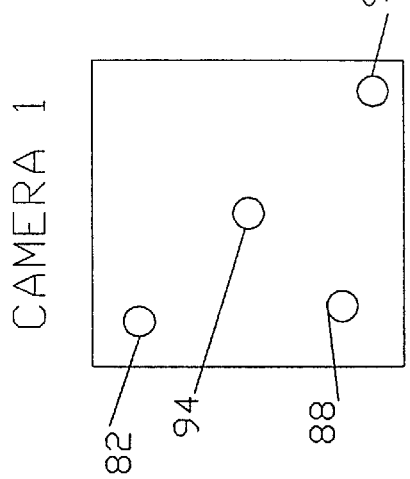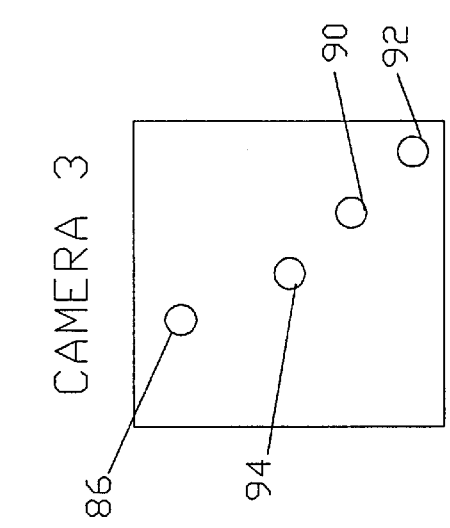
FIG. 3

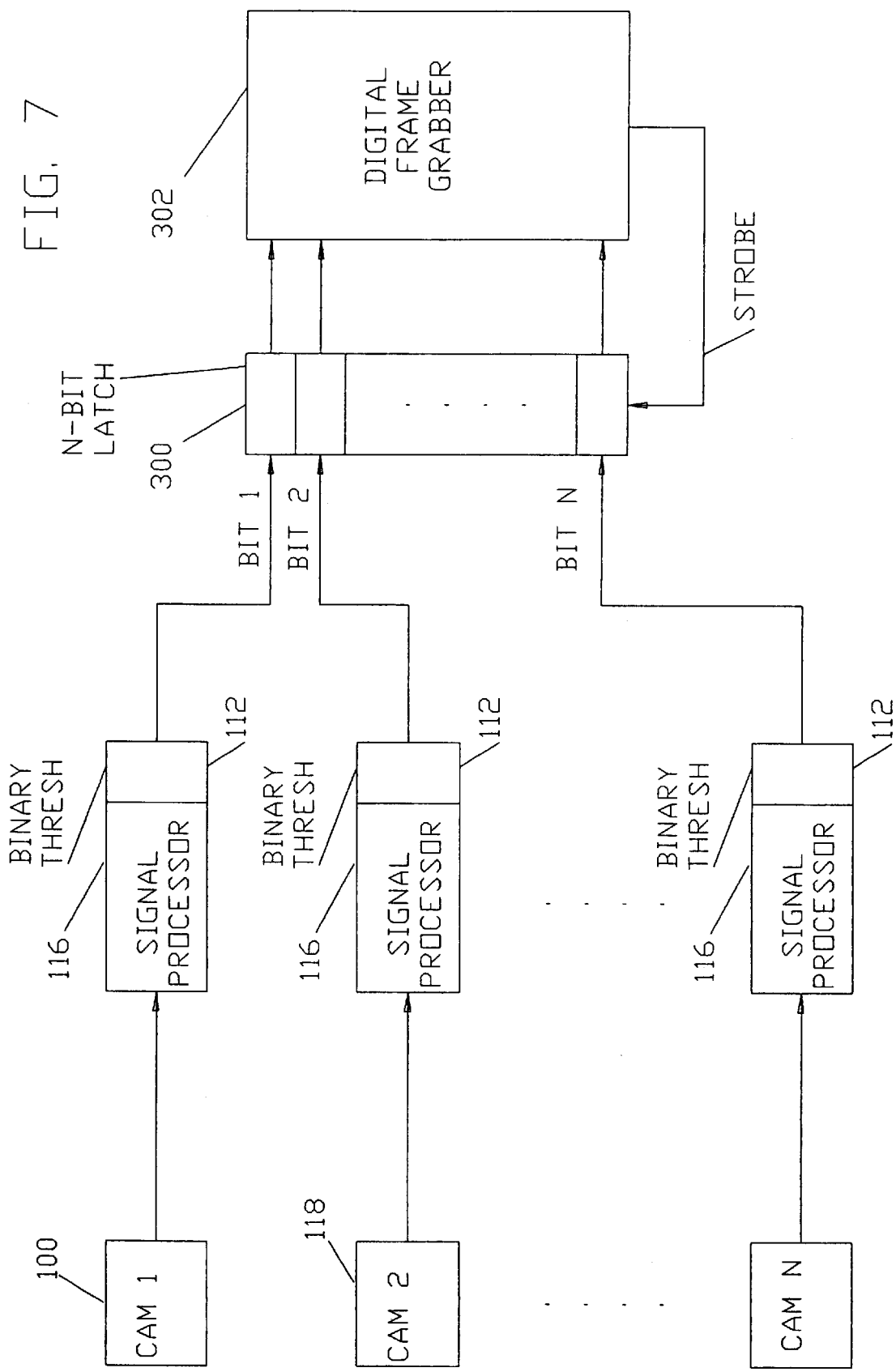

ANALOG VIDEO MERGING SYSTEM FOR MERGING N VIDEO SIGNALS FROM N VIDEO CAMERAS

CROSS-REFERENCE TO RELATED APPLICATION

The application is a continuation of applicant's co-pending United States Provisional patent application Ser. No. 60/041,624 filed Mar. 27, 1997.

INTRODUCTION

This invention relates to an analog video merging system, and more particularly to a system that can take the output of a plurality of video cameras and form a single video signal containing the combined information, which can be fed to a computer having only a single frame grabber card or device.

This system is used to track targets using multiple video cameras. The targets can be either passive contrasting targets or energy emitting targets.

One example of such a system is for use in recording and processing the movement of a person so that the movement information can be used to produce animated pictures. Targets, either active or passive are placed on strategic parts of the human anatomy. The movement of the human is then carried out within the observation field of a plurality of strategically placed video cameras. The movement of the targets is observed by the plurality of video cameras and the signal output of each camera is fed into an analog video merging unit which is the focus of the present invention. The unit of the present invention combines the video signals of all of the cameras to produce a combined video signal. The information content of the combined video signal contains the movement information of the targets observed by all of the cameras. The combined video signal information is such that a single frame grabber card, its associated memory and a computer can reproduce the target information from each of the cameras.

Prior art systems used one frame grabber card and its associated memory for each video camera. The resulting system was expensive because each frame grabber card is expensive. In addition, depending on the resolution required, a large amount of memory must be associated with each frame grabber card. Since there is a large amount of memory in the prior art system, there is also a great deal of data stored in that memory. The computer must process this large amount of data in order to determine the location and movement of the targets and as a result the computer must have a large computing capacity. This is especially true if "real time" processing of the moving targets is desired.

There are prior art systems that multiplex more than one video signal in order to mix video sources to add text to images and to superimpose part of one image on another. Weather channel material is a prime example of prior art multiplexing applications with locally added text, graphics, and complete video streams multiplexed or merged with centrally produced video. Pixel-by-pixel multiplexing is intended for switching between two video streams, without changing the intensity and/or colour values of the active stream.

The output of an analog video merging system according to the present invention contains information from all of the video sources at every pixel, but the exact values of intensity and/or colour at each pixel are lost.

SUMMARY OF THE INVENTION

The present invention takes the video signal from a plurality of cameras and, processes each signal and then combines the processed results to form a combined video signal. The combined video signal contains all the information concerning the dynamic movement of a plurality of moving targets as observed by each camera. The combined video signal is a frame by frame stop motion "picture" of the physical location of the moving targets as observed by each camera. The information contained in each frame of information from each camera is combined in the combined video signal which can be digitized and stored by a single frame grabber card, subsequently allowing computer software to extract the target information originally supplied by each frame of each camera.

The frame grabber card takes the combined video signal output from the present invention, which is an analog signal and digitizes it on a frame by frame basis. Depending on the frame grabber, each frame is digitized at a predetermined resolution. For example the frame grabber may take each horizontal line of a video frame and break it up into 1,000 parts or pixels. Depending on the type of cameras used, the frame may contain 1,000 lines of horizontal information. If this is the case then each frame requires 1 megabyte of storage capacity. In this example it is assumed that 1 byte contains 8 bits. If the present invention modifies each video camera input so that the combined video output signal contains the information of each camera uniquely, the system could handle 8 cameras. The combined video signal would contain either a black level meaning at that location in a horizontal line in a video frame no target was observed by any camera or 1 of 256 ($2^8$) unique video signal levels ranging incrementally between the black level and the white level depending on whether 1, 2, 3, . . . or 8 cameras simultaneously observed at target at a particular location represented by a location on a horizontal line of the combined video signal. Since all 8 cameras are synchronized together, the combined video signal output contains information concerning the physical location of a plurality of targets observed by all 8 cameras. The 256 unique levels of analog video signal are digitized by the frame grabber and uniquely fill an 8 bit/byte memory array. The "X" and "Y" dimensions of the memory are sized to conform with the resolution of the system. As was mentioned above, if the cameras have a 1,000 line per frame resolution and the frame grabber has a resolution of 1,000 pixels per horizontal line, the memory requirements per frame is 1 megabyte. Most frame grabbers systems have a four frame cache.

The present invention processes the video signal of each camera so as to provide a unique signal for each camera. The video signals are then combined to form one combined video signal containing the information uniquely encoded for each camera.

In order to enhance the extraction of only targets from the video picture, a filter can be placed over the lens of each camera so that the camera observes only a background signal level or the signal level of a target as the camera scans a field of view.

For example the present invention takes the video output signal of camera 1 and strips away the horizontal sync pulse leaving only the video information signal ranging from say 0 volts to 1 volt, representing a continuum from a black level to a white level, respectively. Because of the filter over the camera lense, when camera 1 is not observing a target at a particular point in a frame scan of the field of view, the video output of the camera is at or near a black level, i.e. 0 volts. When camera 1 scans over a target, the video ouput of the camera is at or near a white level of 1 volt. The present invention continuously compares the video signal level output from camera 1 with a dynamic threshold voltage, which is usually about 0.5 volts and outputs either 0 volts, when no target is present, or 1 volt ($2^0$), when a target is present.

The present invention does exactly the same operation for camera 2. However, for this camera, the present invention produces either 0 volts, for no target or 2 volts ($2^1$) for a target.

The present invention processes the output of camera 3 to provide either 0 volts for no target and 4 volts ($2^2$) for a target.

Similarly the present invention processes cameras 4, 5, 6, 7, and 8 so as to produce 0 volts or 8, 16, 32, 64 and 128 volts for observing either no target or a target, respectively. Of course modem integrated circuitry does not process such high voltages so the ones mentioned above are merely for the sake of explanation and will in fact be some scaled ratio of the above example voltages.

All these voltages are then summed to and again appropriately scaled to produce a combined video signal.

However it should be observed that as the signals are combined their uniqueness is maintained.

For example, if camera 1 and camera 2 are considered, either each sees no target, each sees a target at a different location on a horizontal scan and therefore the combined signal is at 1 volt or 2 volts depending on which camera sees the target or the combined video voltage is 3 volts meaning that both cameras saw the target at the same location. By choosing the voltages output by the present invention as set out above, the combined video signal is coded in such a manner that the signal level represents all combinations of the 8 cameras observing the moving targets.

As was mentioned above, the combined video signal is scaled so that the maximum voltage of 1 volt is present in the situation where all 8 cameras observes a target at the same time. The sync pulse is also input into the combined video signal output from the present invention to the frame grabber.

The frame grabber then digitizes the combined video signal and stores it in the memory. The memory cell of a location in the frame of the combined video signal where none of the cameras observed a target would contain 00000000. The memory location for the situation where camera 1 observed a target but no other camera observed a target at the same location at the same location would be 00000001. The memory location for the situation where camera 2 observed a target but not camera 1 would contain 00000010; the same situation for camera 3 would be 00000100 and the situation for cameras 1 and 2 both observing a target would be 00000011. If all cameras observed a target in the same location the memory cell would contain 11111111. In this way a unique memory cell content is provided for each possible combination of events for each of the 8 cameras. This data can be processed by the computer to uniquely map the movement of the plurality of moving targets in the field of view. The computational capability of the computer has been reduced by the requirement to only handle one frame grabber card or device, and by the effective "front end" target extraction performed by the analog merging system.

In accordance with one aspect of the present invention there is provided an analog video merging apparatus for merging N video signals from N video cameras, where N is an integer greater than 1, comprising: N video processing means, each said N video processing means connected to said N video cameras in a one-to-one correspondence, wherein each of said N video processing means compares the video signal associated with one of said N video cameras with a dynamic predetermined threshold level and produces a binary output signal having a low level and a high level, the low level being output if the associated video signal is below said predetermined threshold, and high level being output if the associated video signal is above said predetermined threshold; N binary combining means, each said N binary combining means connected to said N video processing means in a one-to-one correspondence, each of said N binary combining means producing a processed binary signal having a low level and a high level, the low level being output in the presence of a low level output from the associated video processing means and a high level being output in the presence of a high level from the associated video processing means, wherein said high level of said processed binary signal is a unique level to that particular binary combining means such that a unique high level is output from said N binary combining means that is associated with said N video cameras; and a summing means for summing N processed binary signals from said N binary combining means to produce a merged video signal. The processed binary signals from the N binary combining means could be in the ratio $2^{N-1}$ such that each processed binary signal is unique.

In accordance with another aspect of the present invention there is provided A method of merging N video signals from N video cameras including the steps of: removing the horizontal sync pulse from each video signal to produce N sync separated video signals; producing a dynamic threshold signal from the each of said N sync separated video signals; comparing each of said N video signals with it's associated dynamic threshold signal to produce N binary video signals each having a low level and a high level, wherein said low level is produced when said associated video signal is below said threshold signal and said high level is produced when said associated video signal is above said threshold signal; providing N unique binary video signals associated with said N binary video signals, each of said N unique binary video signals having a low level and a high level, wherein said low level is produced when an associated binary video signal is at a low level and wherein a unique high level is produced when an associated binary video signal is at a high level; and summing said N unique binary video signals to produce a single merged video signal.

BRIEF DESCRIPTION OF THE DRAWINGS

The present invention will be described in detail hereinbelow with the aid of the accompanying drawings, in which:

FIG. 3 is a schematic diagram of a three camera system showing how targets are uniquely combined according to the present invention;

FIG. 7 is a block diagram of a digital output embodiment of the present invention.

DETAILED DESCRIPTION

Figure 1:
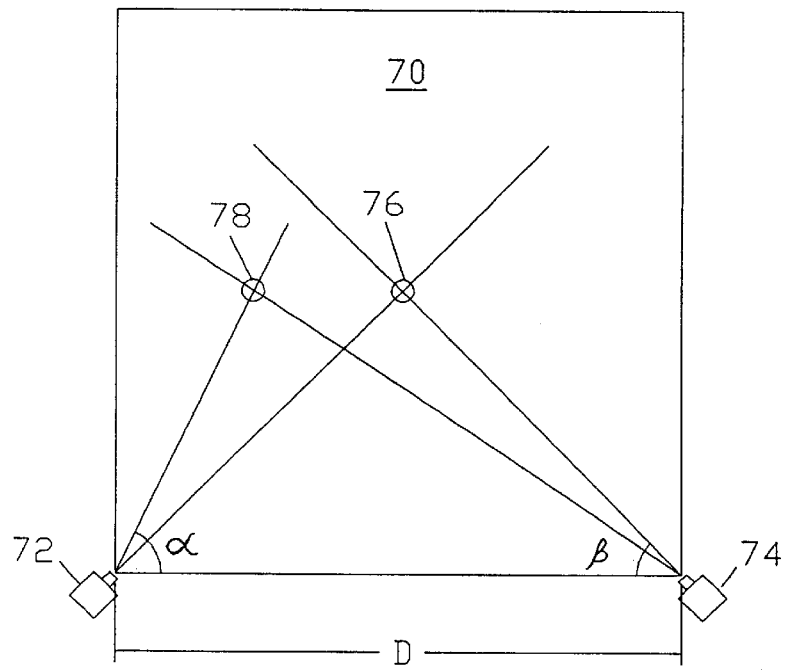
FIG. 1 is a schematic diagram of a two dimensional system for explaining the present invention.

FIG. 1 shows a square field 70. Located at the bottom left corner of the field 70 is a video camera 72. Camera 72 is mounted so that the axis of the lens is at a 45 degree angle with respect to the bottom and the left side of the field 70. The field of view of the camera 72 covers the entire field 70. A second camera 74 is located at the bottom right hand corner of the field 70. Camera 74 is mounted so that the axis of the lens is at a 45 degree angle with respect to the bottom and the right side of the field 70. Again, the field of view of the camera 74 covers the entire field 70.

If the distance between the cameras D is known, and the angles α and β between the bottom of the field and a ray drawn through the target is known for each camera, the exact location of the target can be determined and stored in a memory.

For example, consider the target when it is at location 76 in the field 70. Knowing the fixed distance D between the cameras and knowing that the angles α and β are equal it can be mathematically determined the location 76 is in the center of the field 70. The shape or colour of the target is not important. The only important information is the location of the target at that particular instant in time. In the next instant, in this case in the next frame of the video signals coming from cameras 72 and 74, the target moves to location 78. Again by knowing the value of the distance D between cameras and the value of the angles α and β, the location of the target can be determined and its location stored in a memory.

The present system does not encompass the calculation of target positions but provides the raw data to allow the computer software to accomplish this task. The location of a target left or right (or up or down) from the center pixel of a given camera video image, is a measure of the angle of the target from the camera's center line of vision. By observing a given target in a plurality of cameras whose relative positions are known, the exact location of the observed target can readily be calculated.

Figure 2:
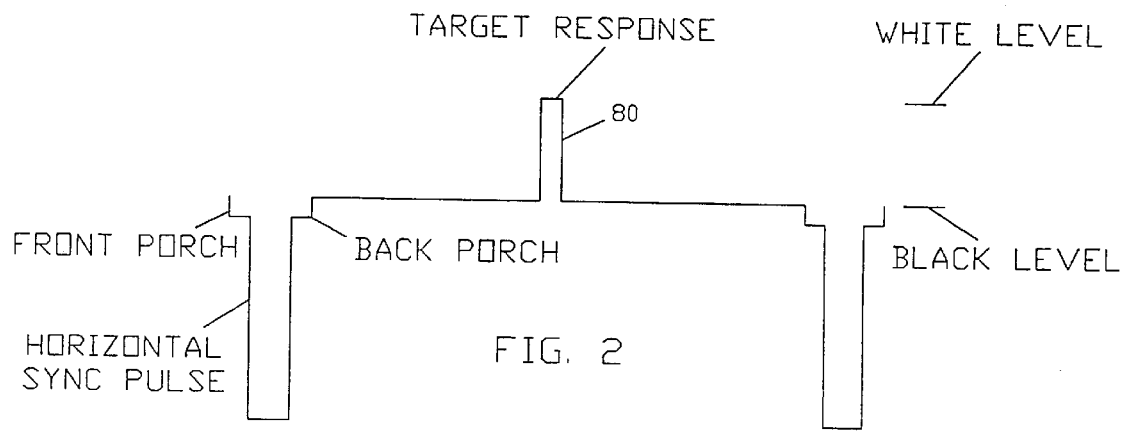
FIG. 2 is a diagram of a single horizontal line in a frame of a video signal, used to explain the present invention.

FIG. 2 is a diagram of one horizontal line of a video signal with a single NIR target located about at the middle of the camera field of view. The present invention, removes the horizontal sync pulse from the horizontal line and then processes the video signal remaining. The invention then sums each similar line of a plurality of cameras and sums the output of the processed line from each video camera. The invention then scales the resulting summed signal to produce a video signal having normal voltage levels and then adds the sync pulse back into the combined video signal.

A filter sensitive only to the target signatures can be placed over the lens of the camera so that in the absence of a target the video level is approximately 0 volts, representing a black level. When a target is scanned the voltage jumps up to approximately 1 volt, representing a white level. Pulse 80 is shown in FIG. 2, representing a target.

FIG. 3 is a diagram that explains the way the video signals from three cameras are combined to provide unique and reproducible information in a combined video signal for targets that are observed only by each camera separately, by cameras 1 and 2, by cameras 1 and 3, by cameras 2 and 3, and finally by all cameras 1, 2 and 3.

The circle 82 shown in the field of view of camera 1 is not seen by cameras 2 and 3. This could be for any number of reasons including a target being on the moving arm of a subject and being obscured by the subject's other arm and/or the subject's body. The target appears in the combined video signal as circle 82c and is processed by the present invention to produce at a particular output 1 volt ($2^0$). It should be understood that the voltages mentioned in this description of the present invention are unimportant. What is important is that the voltage is unique to the fact that only camera 1 observed the target.

The circle 84 is seen only in the field of view of camera 2 and appears as circle 84c and has a voltage level of 2 volts ($2^1$) in the combined video.

Similarly circle 86 in the field of view of camera 3 appears as circle 86c in the combined video and has a voltage level of 4 volts($2^2$).

A target represented by circle 88 is observed by both cameras 1 and 2 in exactly the same location along a horizontal line of both cameras which are synced together. The present invention processes both cameras individually but sums the result to produce a unique circle in the combined video at circle 88c having a voltage level of 3 volts (1 volt+2 volts).

A target represented by circle 90 is observed by both cameras 2 and 3 in exactly the same location along a horizontal line of both cameras which are synced together. The present invention processes both cameras individually but sums the result to produce a unique circle in the combined video at circle 90c having a voltage level of 6 volts (2 volts+4 volts).

A target represented by circle 92 is observed by both cameras 1 and 3 in exactly the same location along a horizontal line of both cameras which are synced together. The present invention processes both cameras individually but sums the result to produce a unique circle in the combined video at circle 92c having a voltage level of 5 volts (1 volt+4 volts).

Finally, a target represented by circle 94 is observed by all three cameras in exactly the same location along a horizontal line of all three cameras which are synced together. The present invention processes all 3 cameras individually but sums the result to produce a unique circle in the combined video at circle 94c having a voltage level of 7 volts (1 volt+2 volts+4 volts).

In order to provide a unique and useful video signal for use by the frame grabber, the combined video signal is adjusted so that the maximum output of 7 volts is represented by a white signal level of 1 volt with the remaining smaller voltage pulses scaled accordingly. The black level of 0 volts represents a location in the field of view of all the cameras that is absent a target. The purpose, of course, of producing these voltages is that upon conversion from analog to a 3-bit (in this case) digital value per pixel by the frame grabber card, the presence, or absence of a target in that pixel, seen by each camera, is shown by a 0 or a 1 in the relevant bit.

Figure 4:
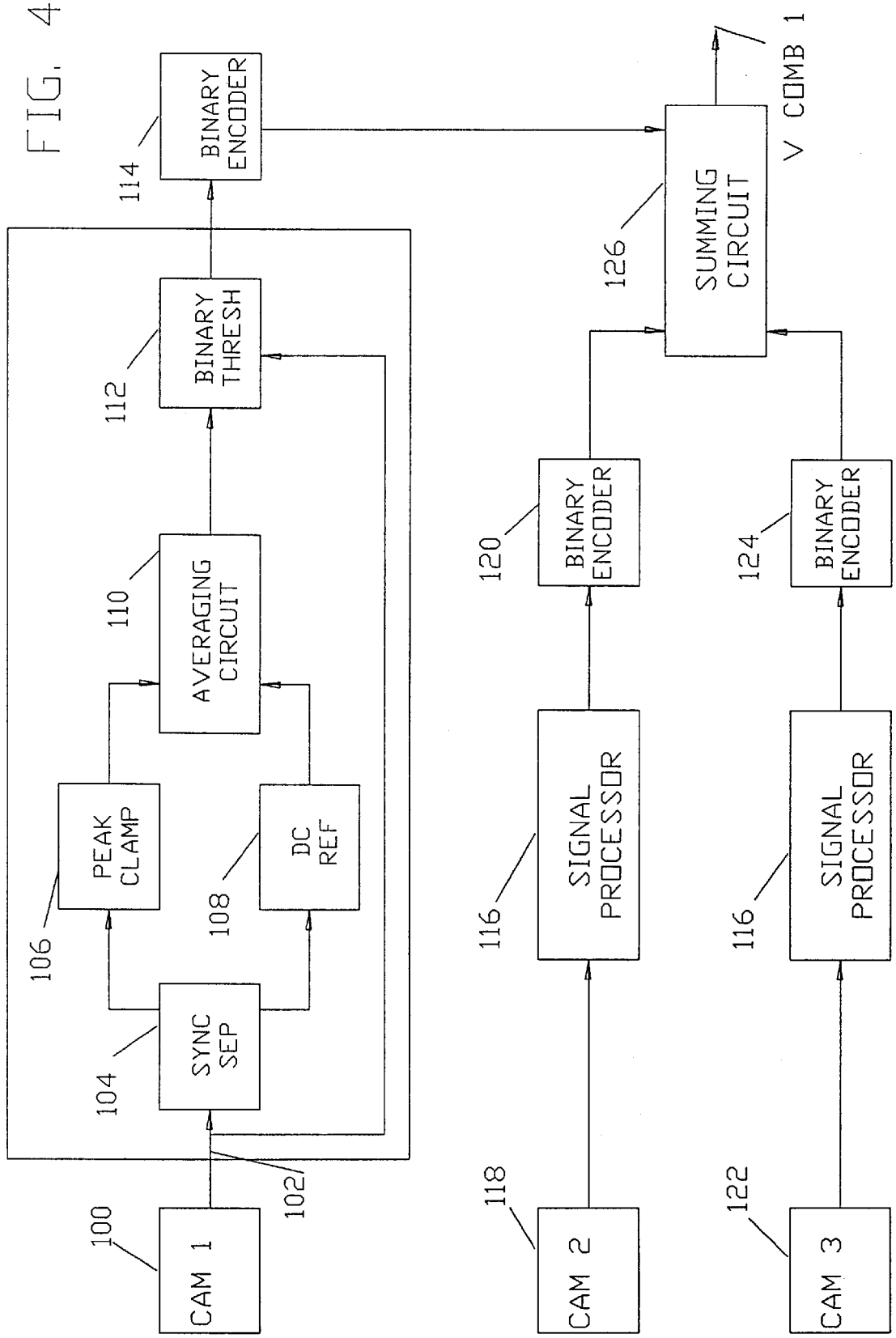
FIG. 4 is a block diagram of one embodiment of the present invention.

FIG. 4 is a block diagram of one embodiment of the invention.

A first video camera 100 outputs a video signal on line 102 to a sync removal circuit 104. A Peak Clamping circuit 106, and a DC reference circuit 108 then process the video signal. The peak clamping circuit produces a voltage level at a value equal to the highest voltage appearing in the video signal. The DC reference circuit produces a long term average of the signal (near 0). The DC reference and this peak value are feed to an averaging circuit 110 that produces the dynamic threshold to which the actual video signal will be compared in the binary thresholding circuit 112. Signals denoting targets must exceed a minimum target value $$S_{target} \geq S_B + 2*\sigma$$

where $S_B$ is the signal level denoting the background level, and is estimated by:

$$S_B = \int_0^t S(\gamma)((1 - e)^{-(t-\gamma)/\tau}) d\gamma$$

the mean absolute central difference σ of the signal above the background is given by:

$$\sigma_B = \int_0^t |S(\alpha) - S_B|(1 - e^{-(t-\alpha)/\tau}) d\alpha$$

and τ is the time constant of the threshold estimation subsystem and is set to correspond to 3 frames times (100 milliseconds). These equations are readily implemented in analog circuitry in box 110 of FIG. 4.

Binary threshold circuit 112 has as its input the dynamic threshold signal from averaging circuit 110 and the video signal from camera 100. If the instantaneous comparison between the video signal and the threshold value is below the threshold value the binary threshold circuit 112 outputs a 0 voltage. If the instantaneous comparison between the video signal and the threshold value is above the threshold value the binary threshold circuit 112 outputs a value of 1 volt. Therefore each horizontal line of camera 100 is compared to a threshold and the output of binary threshold circuit 112 is 0 volts if the camera does not observe a target and is 1 volt if a target is detected.

Binary encoding circuit 114 is a circuit that either produces a signal of 0 volts or an output of a unique voltage depending upon which camera is being processed. For example, if circuit 114 is associated with camera 1, its output will be either 0 volts or 1 volt, depending on the observance of no target or the observance of a target by camera 1.

All of the circuitry including sync removal circuit 104, peak clamping circuit 106, DC reference circuit 108, averaging circuit 110 and binary threshold circuit 112 are located in FIG. 4 in a box 116 defined as a signal processor.

The output of a second camera 118 is fed in exactly the same manner into an identical signal processor box 116. However, the output of processor 116 for the second camera 118 is fed to a binary encoding circuit 120 that produces a unique output signal for the second camera. If the video signal for the second camera is below the dynamic threshold, circuit 120 produces a 0 voltage signal. If the video signal from the second camera 118 is above the threshold, circuit 120 provides a 2 volt output.

The output of a third camera 122 is fed in exactly the same manner into an identical signal processor box 116. However, the output of processor 116 for the second camera 118 is fed to a binary encoding circuit 124 that produces a unique output signal for the second camera. If the video signal for the second camera is below the dynamic threshold, circuit 124 produces a 0 voltage signal. If the video signal from the second camera 118 is above the threshold, circuit 124 provides a 4 volt output.

In a similar manner N cameras can be connected to N processing units which feed N binary encoders each of which produce either a 0 volt output or an output voltage that is unique to the camera, e.g., $2^{N-1}$ volts. In the earlier part of this description, it was mentioned that 8 cameras were a convenient number because of the 8 bit byte for memory units. The number is not limited to 8, and in fact the number could be up to 10, in the case where 10 cameras feed, via the present invention, a 10 bit frame grabber card. Alternatively, depending on the price of the system, a lower number of cameras can be combined. In the example in FIG. 4, a three camera system is described.

The output of all of the binary encoding circuits, one for each camera is fed to a summing circuit 126. The summing circuit 126 combines all of the outputs to form a new, combined video output signal V Comb. As was explained with reference to FIG. 3, since the output of each binary encoding circuit produces a signal unique to its associated camera, the combined video output contains information on the location of all observed targets from all cameras.

The summing circuit, in addition to performing the summing operation, scales the resulting video signal so that the maximum level, which would represent all cameras observing a target is scaled to a white video level of approximately 1 volt, with all the remaining discrete signal levels ranging from the black level to the white level. The summing circuit 126 also has as an input, the sync pulse which it restores to the combined video signal.

The output of summing circuit 126 can then be fed to a single frame grabber card for processing into digital pixels. The pixels are stored in the frame grabber buffer memory for use by an associated computer.

Figure 5:
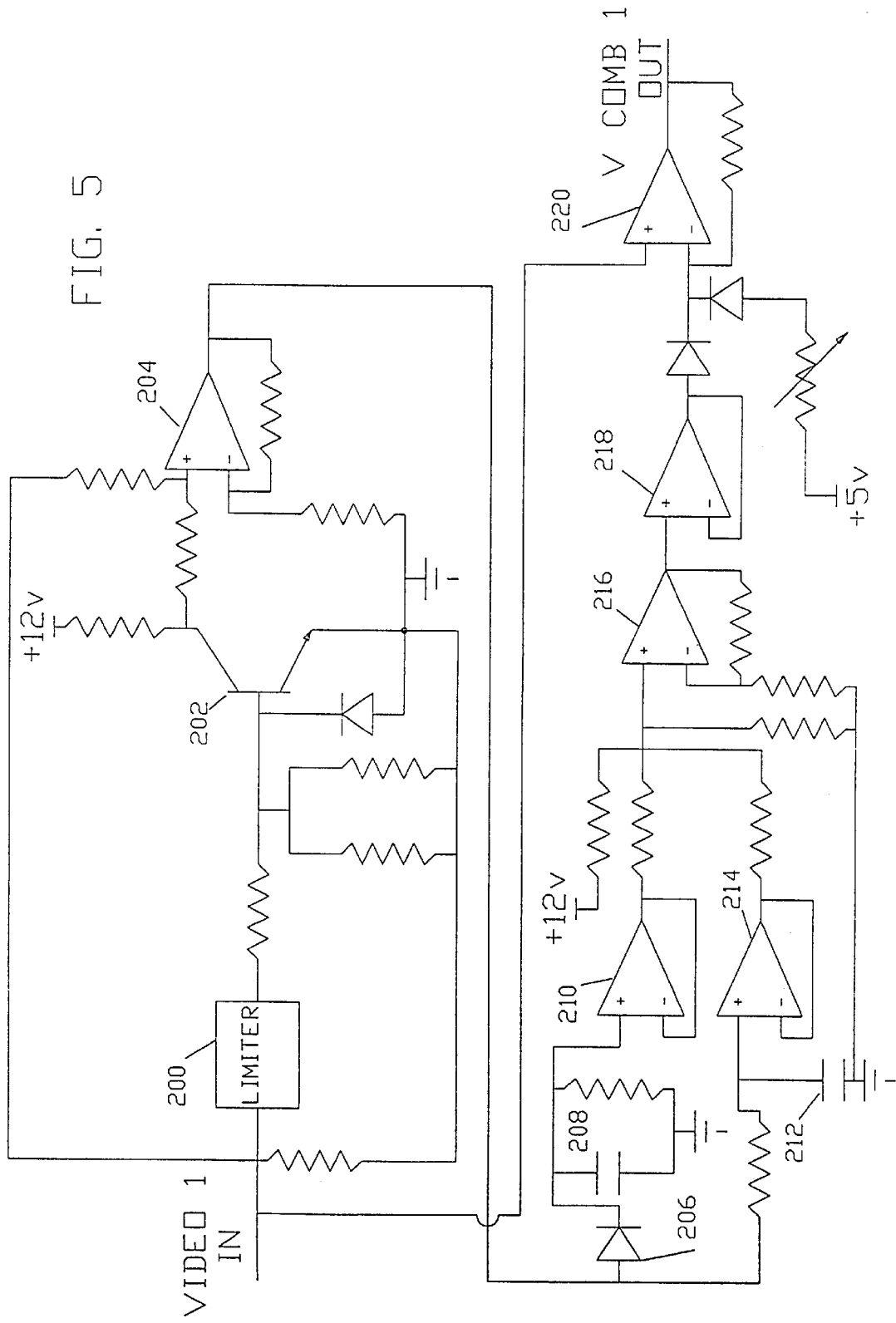
FIGS. 5 and 6 are a schematic diagram of one embodiment of the present invention.

FIG. 5 shows an actual circuit diagram for a single signal processor 116 and a binary encoder 114. This is one of a number of possible circuit implementations and is described herein and set out in the publication entitled "A Real-Time Interactive Motion Tracking System" by Steven Franklin, which is a thesis submitted to the Faculty of Engineering at the Technical University of Nova Scotia, Canada, and which was made available to the public on Mar. 26, 1997. This document is incorporated herein by reference.

A limiter 200, transistor 202 and differential amplifier 204 are series connected to produce a sync separated signal. The sync separated signal is fed to a peak clamping circuit comprising diode 206, capacitor, resistor parallel circuit 208 and differential amplifier 210. The sync separated circuit is also fed to a DC reference circuit comprised of capacitor 212 and differential amplifier 214. The combined output of these two circuits is fed to a binary threshold circuit comprised of two differential amplifiers 216 and 218. The output of differential amplifier 218 is a voltage which is the dynamic threshold voltage as described above.

The binary encoder circuit is comprised of a differential amplifier 220. One input of the differential amplifier 220 is the threshold voltage produced at the output of differential amplifier 218. The other input is the original video signal from one of the cameras. The output of differential amplifier 220 is either 0 or a non-0 value, representing the observance of no target or the observance of a target by camera 1.

Figure 6:
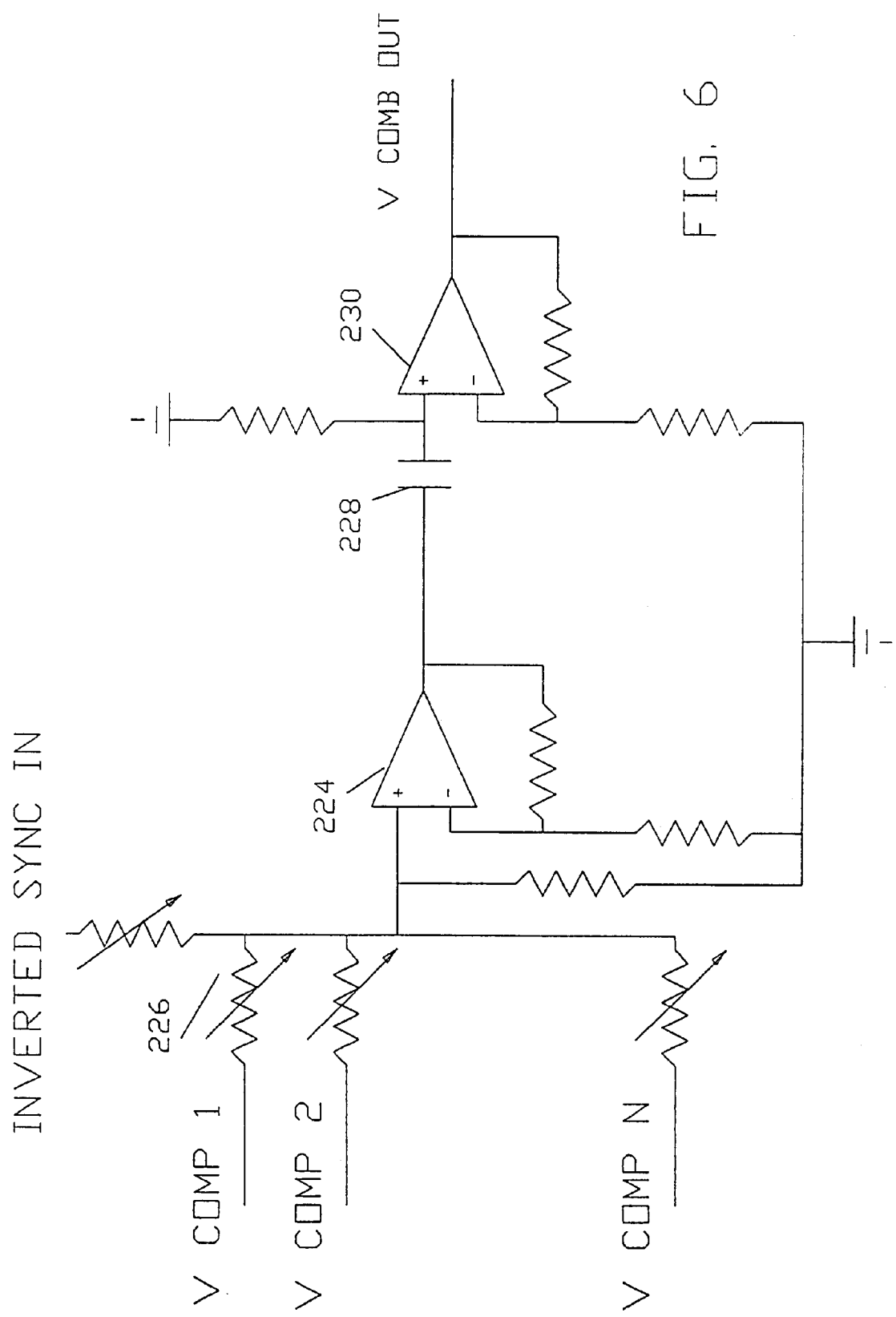

FIG. 6, shows a binary encoding and summing circuit.

The signal from the binary encoder associated with camera 1 is fed to differential amplifier 224, via scaling potentiometer 226. In a similar manner the binary encoded signal associated with the remaining cameras are fed to differential amplifier 224 via their associated scaling potentiometer. The desired binary (or other) code is determined by the adjustment of the scaling potentiometer. Differential amplifier 224 also is fed with, in this case, an inverted sync signal which is added to the scaled signals from each binary encoder. The output of differential amplifier 224 is fed, via capacitor 228 to a final differential amplifier 230. This amplifier is configured to scale the resulting output so that a combined video signal is produced having the correct white and black signal levels.

The output of differential amplifier 230 is the desired output of the present invention. The present invention thus can provide a combined binary scaled signal to a conventional analog to digital frame grabber, its associated memory and a computer.

A further digital output embodiment of the present invention is shown in FIG. 7. In this embodiment the binary encoded signal originally output from the binary threshold circuit 112 of FIG. 4 is fed as a single bit input to an N-bit digital latch circuit 300. Each of the N binary threshold circuits 112 feeds a different bit in the N-bit latch circuit 300. The complete N bits are then read from the latch 300 via a N-wire parallel into a TTL-type digital input of a digital frame grabber card 302, via the pixel clock strobe of the frame grabber card. This circuit has the advantage of a) requiring no adjustment, b) is less sensitive to noise, and c) exploits pixel-by-pixel synchronization to prevent errors.

We claim:

1. An analog video merging apparatus for merging N video signals from N video cameras, where N in an integer greater than 1, comprising:

N video processing means, each said N video processing means connected to said N video cameras in a one-to-one correspondence, wherein each of said N video processing means compares the video signal associated with one of said N video cameras with a dynamic predetermined threshold level and produces an binary output signal having a low level and a high level, the low level being output if the associated video signal is below said predetermined threshold level, and the high level being output if the associated video signal is above said predetermined threshold level;

N binary combining means, each said N binary combining means connected to said N video processing means in a one-to-one correspondence, each of said N binary combining means producing a processed binary signal having a low level and a high level, the low level being output in the presence of a low level output from the associated video processing means and a high level being output in the presence of a high level from the associated video processing means, wherein said high level of said processed binary signal is a unique level to that particular binary combining means such that a unique high level is output from said N binary combining means that is associated with said N video cameras; and a summing means for summing N processed binary signals from said N binary combining means to produce a merged video signal.

2. The apparatus of claim 1, wherein each of said N video processing means is comprised of:

a sync separating means for removing a horizontal sync pulse from its associated video signal;

a peak clamping circuit for determining a peak video voltage in said associated video signal;

a DC reference circuit for providing a constant level signal;

an averaging circuit for connection to said peak lamping circuit and said DC reference circuit for producing said predetermined threshold level; and a binary threshold circuit connected to said averaging circuit and to the associated video signal to provide said binary output signal.

3. The apparatus of claim 2, wherein said summing means includes a scaling means that operates on said merged video signal so that a highest voltage level in said merged video signal is at the white signal level of a normal video signal.

4. The apparatus of claim 1, wherein N is in the range from 2 to 8.

5. The apparatus of claim 4, wherein the high level of said processed binary signal for said N binary combining means is proportional to $2^{N-1}$ volts, i.e., 1,2,4,8,16,32,64, and 128 volts for N=8.

6. The apparatus of claim 5, wherein the merged video signal has discrete signal levels that are proportional to discrete signal levels ranging from 0 to 255 in increments of 1.

7. An analog video merging apparatus for merging N video signals from N video cameras, where N in an integer greater than 1, comprising:

N video processing means, each said N processing means connected to said N video cameras in a one-to-one correspondence, wherein each of said N video processing means compares the video signal associated with one of said N video cameras with a predetermined threshold level and produces an binary output signal having a low level and a high level, the low level being output if the associated video signal is below said predetermined threshold level, and the high level being output if the associated video signal is above said predetermined threshold level;

each of said N video processing means comprising: a sync separating means for removing a horizontal sync pulse from its associated video signal;

a peak clamping circuit for determining a peak video voltage in said associated video signal;

a DC reference circuit for providing a constant level signal;

an averaging circuit for connected to said peak clamping circuit and said DC reference circuit for producing said predetermined threshold level; and a binary threshold circuit connected to said averaging circuit and to an associated video signal to provide said binary output signal;

said apparatus further comprising:

N binary combining means, each said N binary combining means connected to said N video processing means in a one-to-one correspondence, each of said N binary combining means producing a processed binary signal having a low level and a high level, the low level being output in the presence of a low level output from the associated video processing means and a high level being output in the presence of a high level from the associated video processing means, wherein said high level of said processed binary signal is a unique level to that particular binary combining means such that a unique high level is output from said N binary combining means that is associated with said N video cameras; and a summing means for summing N processed binary signals from said N binary combining means to produce a merged video signal.

8. The apparatus of claim 7, wherein said summing means includes a scaling means that operates on said merged video signal so that a highest voltage level in said merged video signal is at the white signal level of a normal video signal.

9. The apparatus of claim 7, wherein N is 8.

10. The apparatus of claim 9, wherein the high level of said processed binary signal for said N binary combining means is proportional to 1,2,4,8,16,32,64, and 128 volts.

11. The apparatus of claim 10, wherein the merged video signal has discrete signal levels that are proportional to discrete signal levels ranging from 0 to 255 in increments of 1.

12. The apparatus of claim 1 wherein said dynamic predetermined threshold level has a level that is determined by:

$$S_{threshold} \geq S_B + 2*\sigma$$

where $S_B$ is a signal level denoting a background level, and is estimated by:

$$S_B = \int_0^t S(\gamma)((1-e)^{-(t-\gamma)/\tau})d\gamma$$

a mean absolute central difference σ of the signal above the background is given by:

$$\sigma_B = \int_0^t |S(\alpha) - S_B|(1 - e^{-(t-\alpha)/\tau})d\alpha$$

and τ is a time constant.

13. An analog video merging apparatus for merging 8 video signals from 8 video cameras comprising:
   8 video processing means, each said 8 video processing means connected to said 8 video cameras in a one-to-one correspondence, wherein each of said N video processing means compares the video signal associated with one of said 8 video cameras with a dynamic predetermined threshold level and produces an binary output signal having a low level and a high level, the low level being output if the associated video signal is below said predetermined threshold level, and the high level being output if the associated video signal is above said predetermined threshold level;
   8 binary combining means, each said 8 binary combining means connected to said 8 video processing means in a one-to-one correspondence, each of said 8 binary combining means producing a processed binary signal having a low level and a high level, the low level being output in the presence of a low level output from the associated video processing means and a high level being output in the presence of a high level from the associated video processing means, wherein said high level of said processed binary signal is a unique level to that particular binary combining means such that a unique high level is output from said 8 binary combining means that is associated with said 8 video cameras; and
   a summing means for summing 8 processed binary signals from said 8 binary combining means to produce a merged video signal;
   wherein the high signal level of said processed binary signal for said 8 binary combining means is proportional to $2^7$ volts, i.e., 1,2,4,8,16,32,64, and 128 volts.

14. A digital video merging apparatus for merging N video signals from N video cameras, where N in an integer greater than 1, comprising:
   N video processing means, each said N video processing means connected to said N video cameras in a one-to-one correspondence, wherein each of said N video processing means compares the video signal associated with one of said N video cameras with a dynamic predetermined threshold level and produces an binary output signal having a low level and a high level, the low level being output if the associated video signal is below said predetermined threshold level, and the high level being output if the associated video signal is above said predetermined threshold level; and
   a N-bit digital latch means for receiving N processed binary signals from said N video processing means to produce N binary signal on an N-wire parallel output.

15. The apparatus of claim 14, wherein each of said N video processing means is comprised of:

a sync separating means for removing a horizontal sync pulse from its associated video signal;
   a peak clamping circuit for determining a peak video voltage in said associated video signal;
   a DC reference circuit for providing a constant level signal;
   a averaging circuit for connected to said peak clamping circuit and said DC reference circuit for producing said predetermined threshold level; and
   a binary threshold circuit connected to said averaging circuit and to the associated video signal to provide said binary output signal.

16. A method of merging N video signals from N video cameras including the steps of:
   removing a horizontal sync pulse from each video signal to produce N sync separated video signals;
   producing a dynamic threshold signal from the each of said N sync separated video signals;
   comparing each of said N video signals with its associated dynamic threshold signal to produce N binary video signals each having a low level and a high level, wherein said low level is produced when said associated video signal is below said threshold signal and said high level is produced when said associated video signal is above said threshold signal;
   providing N unique processed binary video signals associated with said N binary video signals, each of said N unique binary video signals having a low level and a high level, wherein said low level is produced when an associated binary video signal is at a low level and wherein a unique high level is produced when an associated binary video signal is at a high level; and
   summing said N unique processed binary video signals to produce a single merged video signal.

17. The method of claim 16, wherein the summing step includes the step of scaling the single merged video signal so that the single merged video signal has signal levels equal to a standard video signal.

18. The method of claim 17, wherein the step of producing a dynamic threshold signal includes the step of calculating a threshold signal $S_{threshold}$, such that:

$$S_{threshold} \geq S_B + 2^* \sigma$$

where $S_B$ is a signal level denoting a background level, and is estimated by:

$$S_B = \int_0^t S(\gamma)((1-e)^{-(t-\gamma)/\tau})d\gamma$$

a mean absolute central difference σ of the signal above the background is given by:

$$\sigma_B = \int_0^t |S(\alpha) - S_B|(1 - e^{-(t-\alpha)/\tau})d\alpha$$

and τ is a time constant.

19. A method of merging N video signals from N video cameras including the steps of:
   removing a horizontal sync pulse from each video signal to produce N sync separated video signals;
   producing a dynamic threshold signal from the each of said N sync separated video signals;
   comparing each of said N video signals with its associated dynamic threshold signal to produce N binary video signals each having a low level and a high level, wherein said low level is produced when said associated video signal is below said threshold signal and said high level is produced when said associated video signal is above said threshold signal; and reading into an N-bit digital latch said N binary video signals from said comparing step so as to provide a N-bit parallel merged video signal.

* * * * *